INVENTORS
FLOYD A. FIRESTONE
JULIAN R. FREDERICK
BY
Joseph H. Lipschutz
ATTORNEY Patented Jan. 11, 1949

2,458,581

UNITED STATES PATENT OFFICE 2,458,581

SUPERSONIC INSPECTION

Floyd A. Firestone, Washington, D. C., and Julian R. Frederick, Ann Arbor, Mich., assignors to Sperry Products, Inc., Hoboken, N. J., a corporation of New York Application May 21, 1946, Serial No. 671,347

4 Claims. (Cl. 73—67)

This invention relates to improvements in supersonic inspection devices wherein supersonic waves are transmitted into an object or material under test. One such system is disclosed in the patent to Floyd A. Firestone No. 2,280,226, patented April 21, 1942, and consists in transmitting into the object under test a supersonic wave train by means of a piezo-electric element such as a quartz crystal. In said patent the time interval between transmission of the wave train and its reflection from reflecting surfaces within the object under test, such as defects, is measured.

In all such systems it is highly desirable that the maximum amount of sensitivity be imparted to the supersonic wave transmitter, i. e. the crystal, in order that the maximum power may be obtained for transmitting the maximum amount of wave energy into the object under test. For this purpose good contact is essential between the crystal and the object under test and heretofore there has been employed a couplant in the form of a thin film of oil which acted through its volume elasticity to transmit the vibrations from the crystal into the object under test.

The oil film heretofore used, as described above, did not provide in and of itself the maximum sensitivity of coupling. It is, therefore, one of the principal objects of this invention to provide a coupling between the crystal and an object under test which will impart to the crystal a substantially greater sensitivity and will result in a much greater transmission of wave energy into the object and from the object back to the crystal in the case of reflections.

Further objects and advantages of this invention will become apparent in the following detailed description thereof.

In the accompanying drawings.

Figure 1:
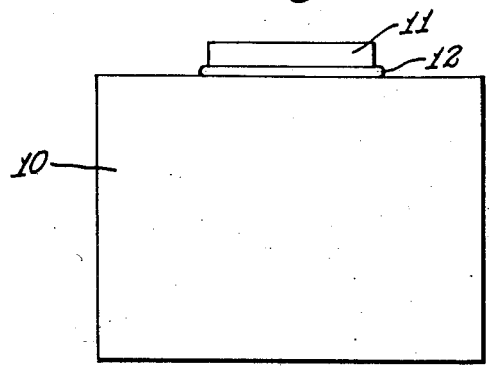
Fig. 1 is a front elevation, largely diagrammatic, illustrating the problem which this invention seeks to solve.

Referring first to Fig. 1, there is shown a solid part 10 which is to be inspected for defects or which is to be measured for thickness by transmitting therein a supersonic wave which may be in the form of a wave train or pulse, or which may be continuous. In any of these cases the supersonic vibrational energy is generated by a piezo-electric element such as quartz crystal 11 which is in engagement with one surface of the solid member 10 through coupling means such as an oil film 12. The oil film is shown greatly exaggerated in thickness for the purpose of illustration but in practice is not more than one-half a wave length in thickness. The crystal is pressed firmly into engagement with the surface of piece 10, but because of unavoidable roughness of said surface the contact is not complete, and therefore the couplant is a necessity to fill in the interspace for effective contact. Such oil film provides considerably better coupling than can be obtained without such film but it does not impart to the crystal 11 the maximum sensitivity so that the maximum energy generated by the crystal may be transmitted into the solid part 10. The reason for the failure of the oil film to produce such maximum sensitivity of the crystal may be due to the compliance of the oil film which thereby permits the crystal to vibrate without producing an equivalent amplitude of vibration on the surface of the piece 10.

Figure 2:
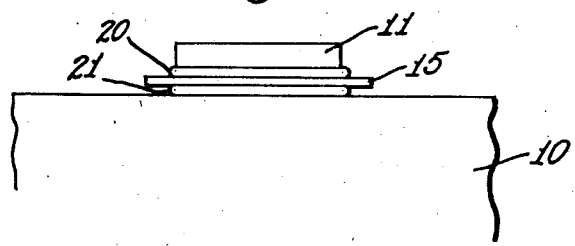
Fig. 2 is a view similar to Fig. 1, illustrating one form of this invention.
Figure 3:
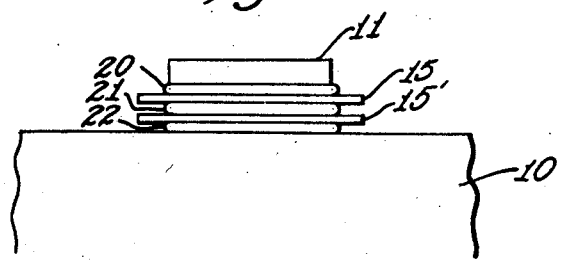
Fig. 3 is a view similar to Fig. 2, illustrating another form of this invention.

In this invention a coupling is provided which does yield greatly increased sensitivity of the crystal with greatly increased transmission of wave energy to and from the workpiece. One such solution is shown in Fig. 2 in which a foil, such as tin foil 15, of density considerably different from that of the couplant is positioned in the so that there is now an oil film 20 between the oil film between the crystal 11 and the workpiece crystal and the foil and an oil film 21 between the foil and the workpiece. The best thickness of foil is found by experiment, and is usually on the order of magnitude of .001", but depends on the frequency and the roughness of the workpiece surface. Such an arrangement has been found to yield much more efficient coupling with higher sensitivity of the crystal and greater power input into the workpiece. Thus, for example, the sensitivity of an eleven megacycle crystal has been increased by a factor of 10 by using a strip of tin foil in the couplant between the crystal and the workpiece. Such increased efficiency may be due to the fact that the compliance of the oil film is overcome to a certain degree by the inertia of the foil, as if this inertia were resonating against the compliance of the couplant. Another way of explaining the action is to regard the foil as supplying an "inertia loading" for the compliance of the couplant. Still another way of explaining the theory behind this action is to state that the metal foil changes the mechanical impedance of the couplant to a degree that the couplant has the optimum mechanical impedance relative to the impedance of the crystal and the impedance of the workpiece.

In another embodiment of this invention two foils 15 and 15' may be interposed in the oil film so that there will now be three oil films, 20, 21 and 22, in conjunction with the two foils, whose optimum thickness is best discovered by experiment.

The foregoing description of the invention is merely illustrative and changes may be made within the scope of the appended claims.

Having described our invention, what we claim and desire to secure by Letters Patent is:

1. In the supersonic inspection of a solid object whose surface may be rough, in which supersonic waves are transmitted by a piezo-electric crystal into the object, a coupling between the crystal and the object comprising a fluid film which is unavoidably relatively thick because of the roughness of the object's surface and a sheet of solid material in the film of greater density than the film so as to divide the film into two layers, one between the crystal and the solid sheet and the other between the solid sheet and the object, the said sheet being thin compared with the wave length in it of the supersonic waves.

2. In the supersonic inspection of a solid object whose surface may be rough, in which supersonic waves are transmitted by a piezo-electric crystal into the object, a coupling between the crystal and the object comprising a sheet of solid material lying between the crystal and the object, a liquid film between the crystal and said solid sheet and a liquid film between said solid sheet and the object, both films and said sheet being thin compared with the wave length in them of the supersonic waves.

3. In the supersonic inspection of an object in which supersonic waves are transmitted by a piezo electric crystal into the object, a coupling between the crystal and the object comprising a plurality of sheets of super-imposed solid foil with a plurality of fluid films in all the spaces between crystal, foils, and object, said sheets being thin compared with the wavelength in them of the supersonic waves.

4. In the supersonic inspection of an object in which supersonic waves are transmitted by a piezo electric crystal into the object, a coupling between the crystal and the object comprising a plurality of sheets of super-imposed solid foil with a plurality of fluid films in all the spaces between crystal, foils, and object, said films and said sheets being thin compared with the wavelength in them of the supersonic waves.

FLOYD A. FIRESTONE.
JULIAN R. FREDERICK.

REFERENCES CITED

The following references are of record in the file of this patent:

UNITED STATES PATENTS

| Number | Name | Date |
| --- | --- | --- |
| 2,280,226 | Firestone | Apr. 21, 1942 |
| 2,430,013 | Hansell | Nov. 4, 1947 |

FOREIGN PATENTS

| Number | Country | Date |
| --- | --- | --- |
| 352,040 | Great Britain | June 29, 1931 |

Certificate of Correction

Patent No. 2,458,581 January 11, 1949

FLOYD A. FIRESTONE ET AL.

It is hereby certified that errors appear in the printed specification of the above numbered patent requiring correction as follows:

Column 2, line 29, strike out the words "oil film between the crystal 11 and the workpiece" and insert the same after "positioned in the" in line 27, same column; and that the said Letters Patent should be read with these corrections therein that the same may conform to the record of the case in the Patent Office.

Signed and sealed this 6th day of June, A. D. 1950.

[SEAL]

THOMAS F. MURPHY,
*Assistant Commissioner of Patents.*